US009180854B2

(12) United States Patent
Eberling et al.

(10) Patent No.: US 9,180,854 B2
(45) Date of Patent: Nov. 10, 2015

(54) DUAL PURPOSE DRYERS FOR HIGH FLOW

(71) Applicants: Charles E. Eberling, Wellington, OH (US); Fred W. Hoffman, Wakeman, OH (US); John V. Ripley, Elyria, OH (US); Robert J. Nechvatal, Columbia Station, OH (US)

(72) Inventors: Charles E. Eberling, Wellington, OH (US); Fred W. Hoffman, Wakeman, OH (US); John V. Ripley, Elyria, OH (US); Robert J. Nechvatal, Columbia Station, OH (US)

(73) Assignee: BENDIX COMMERCIAL VEHICLE SYSTEMS LLC, Elyria, OH (US)

( * ) Notice: Subject to any disclaimer, the term of this patent is extended or adjusted under 35 U.S.C. 154(b) by 116 days.

(21) Appl. No.: 14/200,523

(22) Filed: Mar. 7, 2014

(65) Prior Publication Data

US 2015/0251646 A1  Sep. 10, 2015

(51) Int. Cl.
*B01D 53/04* (2006.01)
*B01D 53/26* (2006.01)
*B60T 17/00* (2006.01)

(52) U.S. Cl.
CPC ........... *B60T 17/004* (2013.01); *B01D 53/0454* (2013.01); *B01D 53/261* (2013.01); *B01D 2257/80* (2013.01); *B01D 2259/4566* (2013.01)

(58) Field of Classification Search
CPC .... B60T 17/004; F02M 35/088; B01D 53/04; B01D 53/0454; B01D 53/0446; B01D 53/261; B01D 2257/80; B01D 2259/40086; B01D 2259/4566

USPC ........... 95/19, 21–23, 117; 96/110, 113, 114, 96/121, 144
See application file for complete search history.

(56) References Cited

U.S. PATENT DOCUMENTS

| 5,378,266 | A | 1/1995 | Elamin |
| 5,917,139 | A | 6/1999 | Goodell et al. |
| 6,074,462 | A | 6/2000 | Quinn et al. |
| 6,125,553 | A | 10/2000 | Quinn et al. |
| 6,581,297 | B1 * | 6/2003 | Ginder ............................... 34/79 |
| 6,695,893 | B2 | 2/2004 | Hoffman et al. |
| 6,858,066 | B2 | 2/2005 | Quinn et al. |

FOREIGN PATENT DOCUMENTS

WO    WO 93/03822    3/1993

OTHER PUBLICATIONS

International Search Report, dated Jun. 19, 2015, in connection with PCT/US2015/018237, filed Mar. 2, 2015.
Written Opinion, dated Jun. 19, 2015, in connection with PCT/US2015/018237, filed Mar. 2, 2015.

* cited by examiner

*Primary Examiner* — Frank Lawrence
(74) *Attorney, Agent, or Firm* — Fay Sharpe LLP

(57) ABSTRACT

A system and method of controlling an air dryer system having first and second air dryers configured to receive compressed air from a compressor, such as a compressor of a vehicle, including operating the first and second air dryers in a first mode corresponding to a high flow mode wherein the first and second air dryers are connected in parallel with the air compressor, monitoring a condition related to a low compressor output state, and operating the first and second air dryers in a second mode corresponding to a continuous flow mode when the low compressor output state is detected.

20 Claims, 3 Drawing Sheets

DUAL PURPOSE DRYERS FOR HIGH FLOW

BACKGROUND

The present invention relates to compressed fluid systems for vehicles. It finds particular application in conjunction with systems utilizing a pair of air dryers for removing moisture from compressed air and will be described with particular reference thereto. It will be appreciated, however, that the invention is also amenable to other like applications.

Transit coaches and air-assisted bulk-off load units are illustrative of compressed air systems used for operating brakes and accessories (e.g., tire inflation systems) of vehicles (e.g., heavy-duty trucks, tractors, trailers, or tractor-trailer combinations). Known air dryers cannot meet the demands of these systems. More specifically, a desiccant material in the air dryer becomes overwhelmed and saturated, ultimately resulting in loss of function.

Continuous flow air dryers are used for air brake vehicle applications where high air use calls for extended charging times and high compressor duty cycles. Continuous flow systems, therefore, typically use a pair of air dryers between a source of compressed air and a storage reservoir. By occasionally purging air to exhaust from an air dryer, the dryer (specifically, the desiccant material) is regenerated and is more effective in removing moisture during its next duty cycle. Accordingly, switching arrangements that alternate the pair of air dryers between charging the reservoir and purging (e.g., one air dryer is regenerated while the other air dryer supplies dry air to the reservoir) have been developed.

Recently, additional onboard features such as bulk unload and central tire inflation systems have become more common. These systems increase the demand for compressed air. To meet the increased demand, some vehicle manufacturers have started providing high output compressors to ensure adequate air supply. One popular high output compressor used on commercial highway vehicles includes a turbo-charge inlet for receiving pressurized air from the engine air intake manifold. Under full boost conditions, this compressor can produce 70 SCFM or more. This output is more than most commercial air dryers can handle without causing excessive pressure at the outlet of the compressor. Thus, two dryers are typically plumbed in parallel to keep the head pressure within acceptable limits. However, when used in parallel, the air dryers cannot provide continuous air because they will need to be taken offline together to be purged. Accordingly, two pairs of air dryers would need to be used to accommodate the high output compressor and still provide continuous run functionality. This adds complexity and cost to the system, and requires additional onboard space for the extra components.

The present disclosure sets forth a new and improved apparatus, system and method which address the above-referenced deficiencies of the art.

BRIEF DESCRIPTION

The present disclosure sets forth a system and method that configures a two dryer air system based on one or more of engine load and/or a vehicle parked condition. For example, a large capacity compressor having an inlet in communication with a turbo-charged intake of a vehicle may have an output, during certain operations in over the road applications, that exceeds the capacity of any given single (e.g, stand alone) air dryer. This can occur, for example, during high engine RPMS when the turbocharger is near maximum boost. To accommodate the high output of the large capacity compressor during such times, two air dryers are connected in parallel to prevent over-pressurization of the compressor discharge line. The two air dryers can be sized to accommodate the maximum output of the large capacity compressor when connected in parallel. The system and method of the present disclosure is also configured to alternately cycle each air dryer between a drying mode and a purging mode during lower compressor output. This configuration allows continuous flow without requiring four air dryers, alternating two at a time, for situations such as bulk unloading, etc.

In accordance with one aspect, a method of controlling an air dryer system having first and second air dryers configured to receive compressed air from a compressor of an associated vehicle comprises monitoring a condition related to a compressor output state, operating the first and second air dryers in a first mode, said first mode corresponding to a high flow mode wherein the first and second air dryers are connected in parallel with the compressor, operating the first and second air dryers in a second mode, said second mode corresponding to a continuous flow mode, and switching the first and second air dryers between the first mode and the second mode based at least in part on the condition related to the compressor output state.

The monitoring a condition can include determining whether a parking brake of the associated vehicle is engaged. The determining can include pneumatically or electronically sensing engagement of the parking brake of the associated vehicle. The operating the first and second air dryers in a continuous flow mode can include alternately drying and purging the respective first and second air dryers, wherein one air dryer is drying air while the other air dryer is being purged. The monitoring can include monitoring an operating characteristic of an engine of the associated vehicle. The monitoring a condition related to low compressor output can include monitoring at least one of a compressor inlet pressure or a compressor outlet air flow.

In accordance with another aspect, an air dryer system for drying compressed air received from an associated high output compressor comprises a first air dryer including a port for receiving pressurized air from the associated compressor, a second air dryer including a port for receiving pressurized air from the associated compressor, and a control module operatively connected to the first and second air dryers for switching the first and second air dryers between a high flow mode and a continuous flow mode, the control module configured to operate the first and second air dryer in the continuous flow mode in response to receiving a signal indicative of a low compressor output, and operate the first and second air dryer in the high flow mode in the absence of a signal indicative of a low compressor output.

The first and second air dryers can each receive air from the associated high output compressor when in the high flow mode. The first and second air dryers can alternately receive air from the associated high output compressor when in the continuous flow mode, and wherein when one air dryer is receiving air from the associated compressor, the other dryer is being purged. The system can further comprise at least one sensor in communication with the control module, the sensor configured to sense a condition indicative of a low compressor output. The system can include the associated high output compressor. The high output compressor can have a turbo charge inlet for receiving compressed air. The system can be included in a vehicle having a turbocharged engine and the high output compressor, the high output compressor can include a turbo charge inlet coupled to the engine for receiving pressurized air therefrom. The vehicle can include a parking brake, and the control module can be configured to detect application of the parking brake and, in response thereto, operate the first and second air dryers in the continuous flow mode.

In accordance with another aspect, a control unit for an air dryer system having first and second air dryers comprises an inlet port for receiving a pressure signal, a first control port for communicating a first control signal to an associated first air dryer, said first control signal corresponding to either a drying mode or a purging mode of the first associated dryer, a second control port for communicating a second control signal to a second associated air dryer, said control signal corresponding to either a drying mode or a purging mode of the second associated dryer, wherein the control unit is configured to communicate first and second control signals to the associated first and second air dryers to maintain the first and second air dryers in a drying mode and, when a pressure signal is received in the inlet port, communicate a first control signal to the first associated dryer corresponding to a dry mode, and simultaneously communicate a second control signal to the second associated dryer corresponding to a purge mode, and alternate the first and second signals over a prescribed time.

In accordance with another aspect, an air dryer system for drying compressed air received from an associated high output compressor comprises a first air dryer including a port for receiving pressurized air from the associated compressor, a second air dryer including a port for receiving pressurized air from the associated compressor, and a control means operatively connected to the first and second air dryers for switching the first and second air dryers between a high flow mode and a continuous flow mode, the control means configured to operate the first and second air dryer in the continuous flow mode during low compressor output and operate the first and second air dryer in the high flow mode during high compressor outlet.

DETAILED DESCRIPTION

Figure 1:
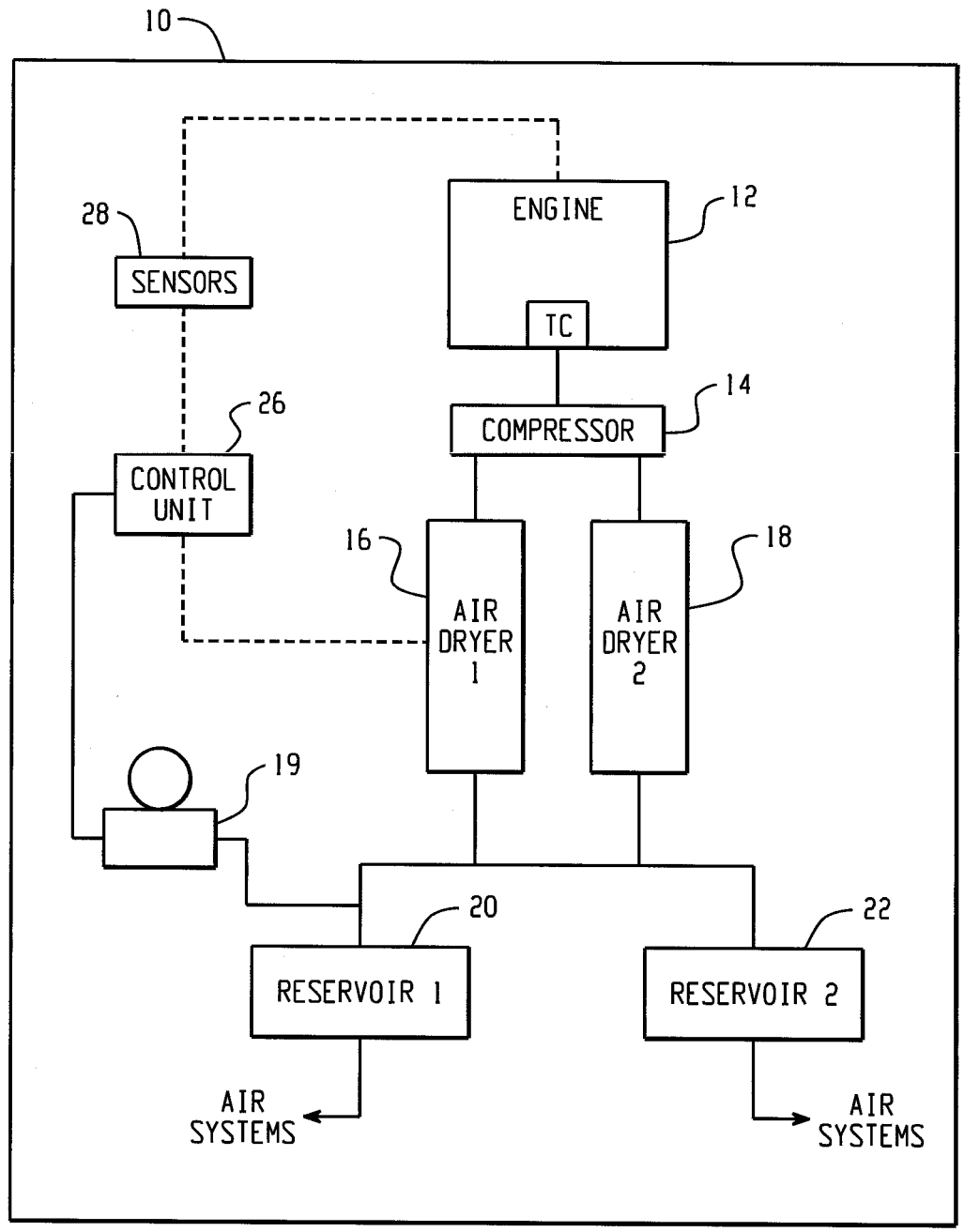
FIG. 1 is a schematic diagram of an exemplary system in accordance with the present disclosure.

With reference to FIG. 1, an exemplary air dryer system in accordance with the present disclosure is illustrated schematically as part of a vehicle 10. The vehicle 10 includes an engine 12 including a turbocharger TC, such as a turbocharged diesel engine of a truck or the like, a compressor 14 pneumatically coupled to the turbocharger TC, first and second air dryers 16 and 18 coupled to the outlet of the compressor 14, and first and second reservoirs 20 and 22 for storing compressed, dried air. In the illustrated embodiment, the compressor 14 is a high output compressor including a turbo inlet configured to receive pressurized air from the turbocharger TC. During times of high boost, the mass flow rate of the air received by the compressor is relatively high, while during times of no or low boost the mass flow rate is relatively low. Accordingly, the output of the compressor 14 flowing to the air dryers 16 and 18 is highest during times of high turbocharger boost and lowest during times of low turbocharger boost.

The compressor 14 supplies compressed air to air dryers 16 and 18. Air dryers 16 and 18 dry and/or filter the air passing therethrough. It should be appreciated that a wide variety of air dryers can be used in accordance with the present disclosure. Air exiting air dryers 16 and 18 is routed to reservoirs 20 and 22. Reservoirs 20 and 22 supply air to one or more systems that utilize compressed air such as a braking system, CTIS, and/or a bulk unload system, for example. It will be appreciated that any number of reservoirs can be used in connection with the present disclosure, and the particular arrangement of the air systems downstream of the air dryers 16 and 18 is not generally of consequence.

The system further includes a controller 26 that is operatively connected to air dryers 16 and 18 and pressure control device 19. The pressure control device is configured to controls the compressor to build air within the system to a predetermined pressure. The controller 26 may be connected to the engine 12 and compressor 14. It will be appreciated that the controller 26 is operative to send and/or receive control signals from the various other system components to control the flow of air through the system. The controller 26 also receives input from one or more sensors 28, as well as from one or more of the other components. In one exemplary configuration, the controller 26 is operative to maintain the air dryers 16 and 18 in a parallel configuration such that each air dryer receives air from the compressor.

When the controller 26 receives an input signal indicative of a low or no-boost state of the turbocharger, the controller switches the air dryers 16 and 18 to a continuous flow mode wherein the air dryers are switched alternately between purge and dry states to provide a continuous flow of air to the reservoirs. That is, one air dryer is purged while the other air dryer receives and dries air from the compressor 14, thus allowing a continuous flow of dried, compressed air. A purge cycle of the air dryer will regenerate the desiccant in the air dryer by changing the direction of air flow through the air dryer and collecting moisture, oil and solid contaminants to be expelled from the air dryer.

The input signal indicative of a low or no-boost state of the turbocharger can be, for example, when a parking brake of a vehicle is engaged. In another embodiment, a sensor can be used to detect the level (e.g., PSI) of boost being generated by the turbocharger, and a threshold can be set under which a signal is generated and sent to the controller to indicate a low boost state. In another embodiment, when a high level of boost is detected by the sensor, and signal can be generated and sent to the controller to indicate a high boost state, and the air dryers can be switched to high flow mode. By defaulting to the high flow mode, there is less likelihood of damage to the compressor or air dryers.

In still another embodiment, the controller can receive input from a vehicle electronic control unit (ECU), and use the information to determine whether to enter the continuous flow mode. For example, information that may be available from a typical ECU can include engine RPM, boost pressure, transmission gear selected (e.g., drive, neutral, park), brake system status, parking brake system status, etc. Based on this information, the controller 26 can be configured to either maintain the air dryers in a parallel configuration, or switch to the continuous flow mode. As an example, the controller can be configured to initiate a continuous flow mode anytime the vehicle is in park, the parking brake is set, or the boost pressure is below a given level, such as 2 PSI. Other embodiments, GPS and/or vehicle speed or location can be used.

Figure 2:
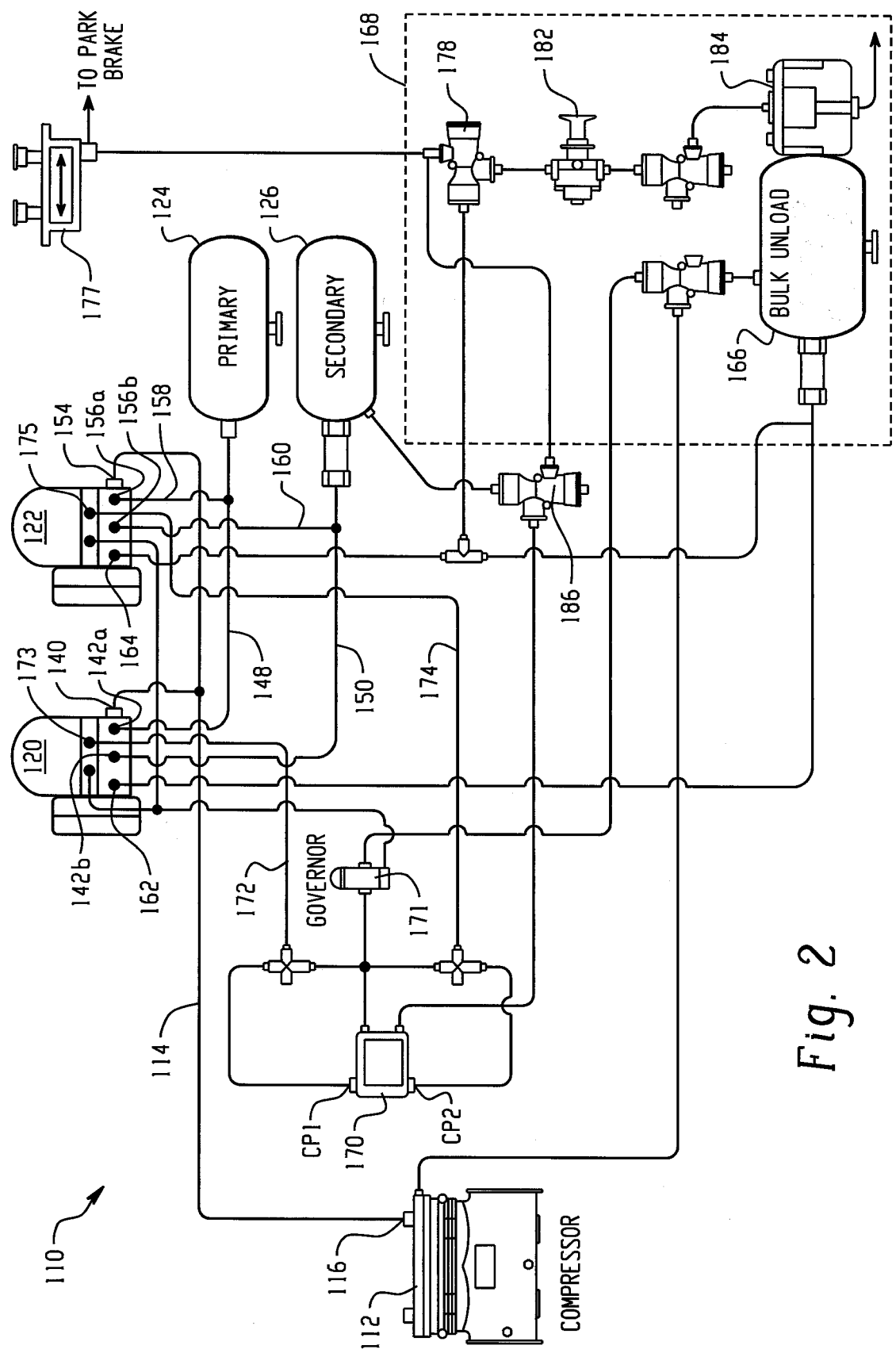
FIG. 2 is a schematic diagram of another exemplary system in accordance with the present disclosure.

Turning to FIG. 2, another exemplary system 110 in accordance with the present disclosure is illustrated. The system 110 includes an air compressor 112, which is typically powered by an engine of a vehicle with which the system is associated. A reciprocating-type compressor having a rotating crankshaft is typically used. However, it is to be understood that any other type of known compressor may be incorporated into the system without departing from the scope and intent of the present disclosure.

The compressor 112 delivers pressurized air to a supply line 114 via a discharge port 116. To prevent damage to the compressor 112, a safety valve (not shown) vents the pressurized air from the compressor 112 to atmosphere if the supply line 114 is blocked. Supply line 114 is connected to first and second air dryers 120 and 122, respectively. As illustrated, the dryers 120 and 122 are disposed so that fluid (e.g., air) flowing through the supply line 114 may pass through either one or both of the air dryers 120 and 122. In the illustrated exemplary embodiment, the dryers 120 and 122 are mounted remotely from respective primary and secondary reservoirs 124 and 126. It is also contemplated in other embodiments that the dryers 120 and 122 can be integrated into the reservoirs 124 and 126, or otherwise mounted thereto. The first and second reservoirs 124 and 126 can include respective purge chambers as is conventional, for purging operations. An example of an exemplary system that can incorporate aspects of the present disclosure is set forth in U.S. Pat. No. 6,695,893 issued on Feb. 24, 2004, which is hereby incorporated by reference in its entirety.

With continued reference to FIG. 2, the first dryer 120 includes a supply port 140, which communicates with the air compressor 112 via supply line 114, and delivery ports 142a and 142b for delivering air to the primary and secondary reservoirs, respectively, via supply lines 148 and 150. The primary reservoir 124 includes a plurality of delivery ports (not shown) for delivering compressed air from the primary reservoir 124 to various compressed air systems within, for example, a vehicle. Similarly, the second dryer 122 includes a supply port 154, which communicates with the air compressor 112 via supply line 114, and delivery ports 156a and 156b for delivering air to the primary and secondary reservoirs respectively, via supply lines 158 and 160. The secondary reservoir 126 includes a plurality of delivery ports (not shown) for delivering compressed air from to various compressed air systems such as braking systems, etc.

Each of the dryers 120 and 122 further includes an auxiliary delivery port 162 and 164 for supplying air to an auxiliary reservoir 166 (e.g., a bulk unload reservoir) of an auxiliary system 168 (e.g., unloading system). Although a single auxiliary reservoir 166 is illustrated, it is to be understood that any number of additional reservoirs are contemplated. In one exemplary application, the primary and secondary reservoirs 124 and 126 are used for braking systems within a vehicle. For example, the primary and secondary reservoirs 124 and 126 can be used for braking front and rear wheels, respectively, of the vehicle. Furthermore, the auxiliary reservoir 166 can be used for supplying compressed air to auxiliary systems on the vehicle (e.g, a bulk unload system or a CTIS).

In addition, each of the dryers 120 and 122 are coupled to a control module 170 via lines 172 and 174. Control module 170 includes control ports CP1 and CP2 for communicating control signals to respective control terminals 173 and 175 of the air dryers 120 and 122 to control flow through the various ports of the dryers. As will be described below, a number of different operating states can be achieved by regulating the flow between the various components of the system.

The control module 170 is coupled to a pressure control device 171, such as the D-2® governor from Bendix Commercial Vehicle Systems LLC. However the pressure control device 171 can be any device that controls the compressor in order to build air to a predetermined pressure. In the exemplary system, the pressure control device 171 sends a positive signal to the control module 170 at a cut-out pressure. The cut-out pressure is generally the air brake system upper operating pressure and may be between 110 psi and 135 psi, for example. When the control module 170 receives the pressure signal, the control module 170 will send a control signal to both of the dryers to initiate a purge cycle regardless of whether the system was operating in the high flow mode or the continuous flow mode.

More specifically, module 170 causes the dryers 120 and 122 to alternately dry air received via the supply line 114. In other words, module 170 alternates each of the dryers 120 and 122 between a dry cycle (mode) and a regeneration or purge cycle (mode). Furthermore, the module 170 ensures one of the dryers (e.g., the dryer 120) is in the dry cycle while the other dryer (e.g., the dryer 122) is in the regeneration cycle. During the regeneration cycle, the air in one of the purge chambers of the primary or secondary reservoirs is used for drying a desiccant in its respective dryer 120 and 122. This configuration is a continuous flow mode wherein a continuous supply of dried compressed air is generated.

In another configuration, the module 170 places dryers 120 and 122 in parallel such that air from supply line 114 enters both dryers 120 and 122. This is a high flow mode that can accommodate greater compressor output without overpressurization in line 114, as compared to the continuous flow mode.

As with the embodiment of FIG. 1, the control module 170 can be in communication with the various components of the system and/or sensors to receive one or more signals indicative of a low compressor output state, in which case the control module 170 can configure the dryers 120 and 122 for continuous flow. In the illustrated embodiment of FIG. 2, a parking brake control valve 177 is operatively connected to both the bulk unload reservoir 166 and the module 170 such that, when the parking brake is activated, a signal is communicated to the module 170 and the dryers 120 and 122 are configured in the continuous flow mode. For example, a low compressor output state is when the compressor is operating at less than a maximum compressor operating pressure. Alternatively, it may sense a high compressor output state for control purposes.

More specifically, inversion valve 178 receives supply air from the second air dryer 122 and, when deactivated, delivers air to the bulk unload valve. In this configuration, a pilot pressure from the parking brake control valve 177 is fed to the control port of the inversion valve 178. When the parking brake is activated, pilot pressure is removed, thereby deactivating valve 178 sending supply air to bulk unload valve 182. Bulk unload valve 182 is connected to a relay valve 184 adapted to supply air for the bulk unload process in response to receiving a signal from the bulk unload valve 182 when it is activated.

In addition, the control port of inversion valve 178 and delivery port of bulk unload valve 182 are coupled with a control port of another inversion valve 186. Inversion valve 186 is configured to supply a control signal to module 170 when the parking brake is activated. That is, when the parking brake valve is activated, no pressure is supplied to inversion valve 178, which in turn means no pressure is supplied to the control port of inversion valve 186, which is thereby deactivated and supplies pressure to module 170. This pressure is a signal indicative of a low or no-boost condition, such as occurs when a vehicle is parked.

In operation, setting the parking brakes will activate the parking brake valve 177 and open inversion valves 178 and 186. Inversion valve 186 sends a pressure signal to module 170, thereby initiating a regeneration (purge) timer and otherwise entering the air dryers 120 and 122 into the continuous flow mode described above. Meanwhile, the bulk unload valve 184, or other system (e.g., CTIS, etc.) is charged for operation with a continuous supply of dry air. The system will remain in continuous flow mode until the parking brake is released, in which case pressure is supplied to the control port of the inversion valves 178 and 186 thereby removing pressure to module 170. The control system is now in the high flow mode.

It will be appreciated that activation of the parking brake is an exemplary manner in which the system can be configured to enter the continuous flow mode. It will also be appreciated that in typical configurations, a parking brake is only activated when the vehicle is parked and the engine is at or near idle. Some vehicles are equipped with a high idle setting, in which case the engine may be operated at a level above idle while the vehicle is parked. However, even in such cases, the compressor output flow can be limited, for example by a reduction in compressor RPM, to ensure the compressor's operating pressure is maintained below the maximum allowable threshold.

It should also be appreciated that an exemplary compressor, with no or minimal turbo boost pressure at the inlet of the compressor, can have a maximum compressor output approximating 30 standard cubic feet/minute at a pressure 120 PSI. In the low flow mode, the flow at the air dryers and the back pressure at the head of the compressor are believed to be within the acceptable limits under this condition thus allowing a flow through one dryer at a time enabling the continuous flow mode as described. That is, a single air dryer is sized to accommodate the maximum compressor output in a low or no boost condition.

It is also anticipated that the high flow mode of the air dryers will approximate a compressor air flow output that can be more than double the output cited in the previous paragraph, such as may occur with turbo boost pressure under normal engine load, for example. The flow at the air dryers and the back pressure at the head of the compressor are believed to be within the acceptable limits while flowing through two dryers simultaneously or in the parallel flow mode as described.

Figure 3:
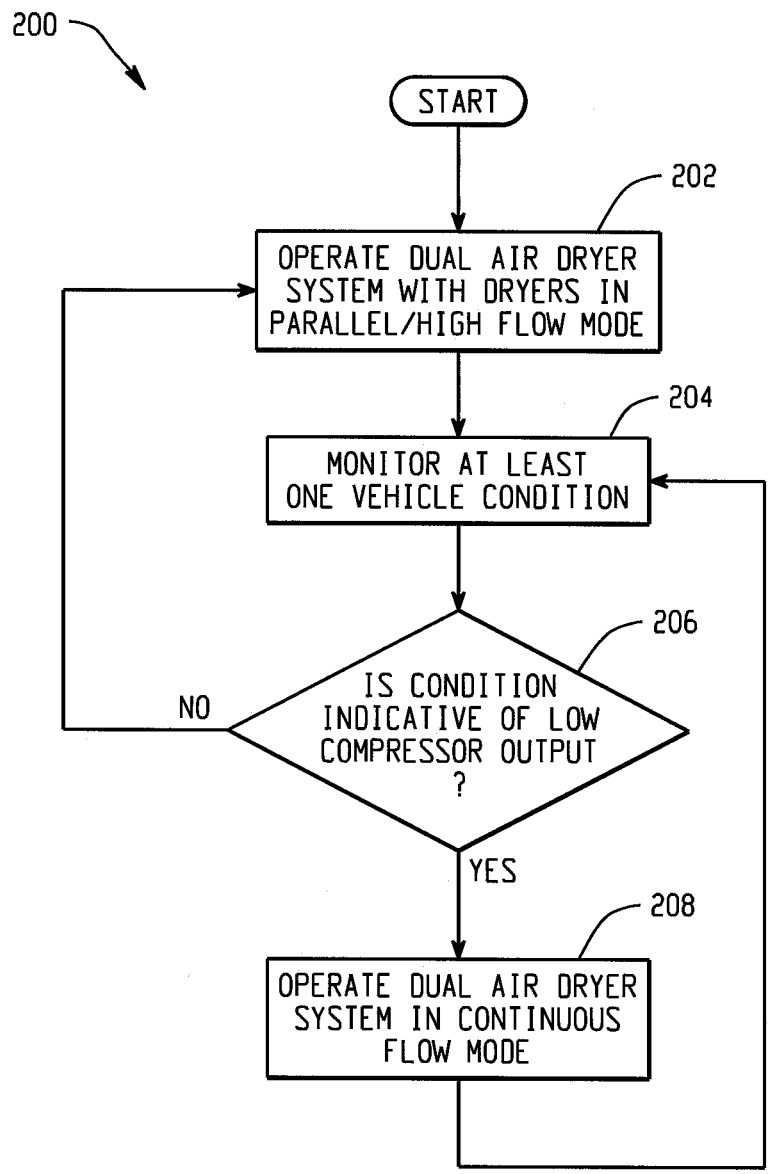
FIG. 3 is a flowchart of a method in accordance with the present disclosure.

Turning now to FIG. 3, a flowchart illustrating an exemplary method 200 in accordance with the present disclosure is shown. The method begins with the system operating with the first and second air dryers in a parallel, high flow mode in process step 202. In process step 204, at least one vehicle condition is monitored. As noted above, this can include, for example, a parking brake state, an engine RPM, a boost pressure, etc. In an alternative embodiment, compressor input and/or output can be monitored. At process step 206, if the monitored condition is not indicative of a low compressor output (e.g., parking brake activated, RPM low, etc.), the method reverts to process step 202 and maintains the air dryers in the high flow mode, parallel configuration. If, at process step 206, the vehicle condition is indicative of a low compressor output, the method proceeds to process step 208 and the air dryers are placed in a continuous flow mode. The method then reverts back to process step 204 until such time that the vehicle condition is no longer indicative of a low compressor output.

It should be appreciated that although the exemplary embodiments have been described in connection with a pair of air dryers, aspects of the invention are applicable to a larger number of air dryers as required by a given application. For example, two pairs of air dryers could take the place of the first and second air dryers described above, with each respective pair being operated in the manner of the first and second air dryers.

Although the above-described exemplary method is set forth in connection with monitoring a vehicle condition, it will be appreciated that other conditions can be monitored and used at least in part to determine when to switch between the high flow and continuous modes. For example, parameters such as compressor inlet pressure, compressor outlet air flow, compressor speed, etc. can be utilized alone or in conjunction with a vehicle condition.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method of controlling an air dryer system having first and second air dryers configured to receive compressed air from a compressor of an associated vehicle, the method comprising:
monitoring a condition related to a compressor output state;
operating the first and second air dryers in a first mode, said first mode corresponding to a high flow mode wherein the first and second air dryers are connected in parallel with the compressor;
operating the first and second air dryers in a second mode, said second mode corresponding to a continuous flow mode; and
switching the first and second air dryers between the first mode and the second mode based at least in part on the condition related to the compressor output state.

2. A method as set forth in claim 1, wherein monitoring a condition includes determining whether a parking brake of the associated vehicle is engaged.

3. A method as set forth in claim 2, wherein the determining includes pneumatically or electronically sensing engagement of the parking brake of the associated vehicle.

4. A method as set forth in claim 1, wherein the operating the first and second air dryers in a continuous flow mode includes alternately drying and purging the respective first and second air dryers, wherein one air dryer is drying air while the other air dryer is being purged.

5. A method as set forth in claim 1, wherein the monitoring includes monitoring an operating characteristic of an engine of the associated vehicle.

6. A method as set forth in claim 1, wherein the monitoring a condition related to compressor outlet state includes monitoring at least one of a compressor inlet pressure or a compressor outlet air flow.

7. An air dryer system for drying compressed air received from an associated high output compressor, the air dryer system comprising:
a first air dryer including a port for receiving pressurized air from the associated compressor;
a second air dryer including a port for receiving pressurized air from the associated compressor; and
a control module operatively connected to the first and second air dryers for switching the first and second air dryers between a high flow mode and a continuous flow mode, the control module configured to operate the first and second air dryer in the continuous flow mode in response to receiving a signal indicative of a low compressor output, and operate the first and second air dryer in the high flow mode in the absence of a signal indicative of a low compressor output.

8. A system as set forth in claim 7, wherein the first and second air dryers substantially simultaneously receive air from the associated high output compressor when in the high flow mode.

9. A system as set forth in claim 7, wherein the first and second air dryers alternately receive air from the associated high output compressor when in the continuous flow mode, and wherein when one air dryer is receiving air from the associated compressor, the other dryer is being purged.

10. A system as set forth in claim 7, further comprising at least one sensor in communication with the control module, the sensor configured to sense a condition indicative of a low compressor output.

11. A system as set forth in claim 7, wherein low compressor output corresponds to a maximum of approximately 30 scfm at 120 psi and the high compressor output corresponds to a maximum output of approximately 60 scfm at 120 psi.

12. A vehicle including a turbocharged engine, a high output compressor, and the air dryer system of claim 7, wherein the high output compressor includes a turbo charge inlet coupled to the engine for receiving pressurized air therefrom.

13. A system as set forth in claim 7, further comprising a parking brake valve, wherein the control module is configured to detect application of the parking brake via the parking brake valve and, in response thereto, operate the first and second air dryers in the continuous flow mode.

14. A control unit for an air dryer system having first and second air dryers, the control unit comprising an inlet port for receiving a pressure signal, a first control port for communicating a first control signal to an associated first air dryer, said first control signal corresponding to either a drying mode or a purging mode of the first associated dryer, a second control port for communicating a second control signal to a second associated air dryer, said control signal corresponding to either a drying mode or a purging mode of the second associated dryer, wherein the control unit is configured communicate first and second control signals to the associated first and second air dryers to maintain the first and second air dryers in a drying mode and, when a pressure signal is received in the inlet port, communicate a first control signal to the first associated dryer corresponding to a dry mode, and simultaneously communicate a second control signal to the second associated dryer corresponding to a purge mode, and alternate the first and second signals over a prescribed time.

15. The control unit of claim 14, wherein upon initiation, the control unit is configured to maintain the first and second associated air dryers in either the drying mode or the purge mode until receiving a signal via the input port indicative of a minimum system pressure.

16. The control unit of claim 14, wherein upon restart the control unit is configured to maintain the first and second associated air dryers in the drying mode in the absence of a pressure signal at the input port.

17. An air dryer system for drying compressed air received from an associated high output compressor, the air dryer system comprising:
a first air dryer including a port for receiving pressurized air from the associated compressor;
a second air dryer including a port for receiving pressurized air from the associated compressor; and
a control means operatively connected to the first and second air dryers for switching the first and second air dryers between a high flow mode and a continuous flow mode, the control means configured to operate the first and second air dryers in the continuous flow mode during low compressor output and operate the first and second air dryer in the high flow mode in absence of signal indicating low compressor output.

18. A system as set forth in claim 17, wherein the first and second air dryers substantially simultaneously receive air from the associated high output compressor when in the high flow mode.

19. A system as set forth in claim 17, wherein the first and second air dryers alternately receive air from the associated high output compressor when in the continuous flow mode, and wherein when one air dryer is receiving air from the associated compressor, the other dryer is being purged.

20. A system as set forth in claim 17, further comprising at least one sensor in communication with the control means, the sensor configured to sense a condition indicative of a low compressor output.

* * * * *

UNITED STATES PATENT AND TRADEMARK OFFICE
CERTIFICATE OF CORRECTION

PATENT NO. : 9,180,854 B2  Page 1 of 1
APPLICATION NO. : 14/200523
DATED : November 10, 2015
INVENTOR(S) : Eberling et al.

It is certified that error appears in the above-identified patent and that said Letters Patent is hereby corrected as shown below:

Claims

In column 8, claim 6, line 49, "outlet" should read ---output---.

Signed and Sealed this
Eighth Day of March, 2016

Michelle K. Lee
*Director of the United States Patent and Trademark Office*